US00RE34971E

United States Patent [19]

Loverich et al.

[11] E Patent Number: Re. 34,971

[45] Reissued Date of Patent: Jun. 20, 1995

[54] SPAR BUOY PEN SYSTEM

[75] Inventors: Gary F. Loverich; Barry A. Griffin, both of Bainbridge Island, Wash.

[73] Assignee: Nor'Eastern Trawl Systems, Inc., Bainbridge Island, Wash.

[21] Appl. No.: 189,157

[22] Filed: Jan. 27, 1994

Related U.S. Patent Documents

Reissue of:

[64] Patent No.: 5,193,481
Issued: Mar. 16, 1993
Appl. No.: 601,871
Filed: Oct. 23, 1990

U.S. Applications:

[63] Continuation-in-part of Ser. No. 339,676, Apr. 18, 1989, Pat. No. 5,007,376.

[51] Int. Cl.[6] ..... A01K 61/00

[52] U.S. Cl. ..... 119/223

[58] Field of Search ..... 119/215, 221, 223, 240, 119/208; 43/7, 14, 103, 104, 105; 441/21, 23, 28, 29

[56] References Cited

U.S. PATENT DOCUMENTS

| | | |
|---|---|---|
| 85,126 | 12/1868 | Pitt . |
| 203,399 | 5/1878 | Wyckoff . |
| 215,031 | 5/1879 | Webb . |
| 1,485,875 | 3/1924 | O'Malley . |
| 3,992,737 | 11/1976 | Duel et al. . |
| 4,147,130 | 4/1979 | Goguel . |
| 4,615,301 | 10/1986 | Maekawa et al. . |

FOREIGN PATENT DOCUMENTS

| | | |
|---|---|---|
| 2507436 | 12/1982 | France . |
| 130198 | 3/1978 | Germany . |
| 254517A1 | 3/1988 | Germany . |
| 51-10665 | 8/1977 | Japan . |
| 62-117465 | 2/1989 | Japan . |
| 1499468 | 2/1978 | United Kingdom . |
| 2057364 | 4/1981 | United Kingdom . |
| 2184631A | 7/1987 | United Kingdom . |
| 2189671A | 11/1987 | United Kingdom . |
| WO87/03170 | 6/1987 | WIPO . |

*Primary Examiner*—Todd E. Manahan
*Attorney, Agent, or Firm*—Christensen, O'Connor, Johnson & Kindness

[57] ABSTRACT

A spar buoy pen system formed of a net pen, vertical spar buoys, and anchors. The spar buoys are formed of elongate tubular columns having a center of ballet above the center of gravity to float in a substantially upright position. Anchor lines, auxiliary floats, and attachment lines deflect the spar buoys at a predetermined angle such that the spar buoys and the anchors cooperate to hold the net pen in a predetermined configuration and in a taut condition. Alternative versions of the system may be provided with damper plates that are attached to the spar buoys so as to limit their wave-induced motions. A predator net can also be attached to the system to protect the net pen and its contents.

27 Claims, 3 Drawing Sheets

SPAR BUOY PEN SYSTEM

Matter enclosed in heavy brackets [ ] appears in the original patent but forms no part of this reissue specification; matter printed in italics indicates the additions made by reissue.

This application is a continuation-in-part of U.S. patent application Set. No. 07/339,676 filed Apr. 18, 1989 now U.S. Pat. No. 5,007,376.

TECHNICAL FIELD

The present invention pertains to net pens for growing fish, other marine life and organisms and, more particularly, to a spar buoy pen system for use in open waters.

BACKGROUND

Fish pens are generally constructed of fish netting that is formed to have a closed bottom, closed sides, and an open or closed top. A horizontal floating frame structure that lies flat On the ocean surface is used to shape the netting and provide a working platform. Weights are hung from the netting to provide draft and shape for the pen. Although these horizontal frame systems have been generally suitable for their purposes, they have several drawbacks.

When used in closed or protected waters, horizontal frame systems are visually objectionable, are inefficient in the use of pen volume, and tend to accumulate waste that pollutes the aquatic environment. While use of the pen system in open waters will avoid this pollution, the horizontal frame systems currently in use with these pen systems are not usable in open waters because of the roughness of the water and the unsteadiness of current flow. In particular, the surface-supported horizontal frames respond to passing waves with violent motions that can cause extreme stress on the structural components of the frame. Furthermore, the use of weights to shape the pen vertically is not compatible with the open water because water currents can move the weights, thus reducing the usable volume of the pen. In other words, the weights become less effective as current increases. As a result, the floating frame pen systems using suspended weights are limited to shallow, vertical configurations that can only be used in closed or protected waters where strong currents and wave conditions are not present. Hence, there is a need for a floating pen system that is stable enough to maintain a workable configuration without undue stress in large bodies of open water or bodies of water where strong currents are present.

SUMMARY OF THE INVENTION

The present invention is directed to spar buoy pen system for holding a pen in a predetermined configuration in an open body of water. The pen system comprises a flexible wall member that restricts movement of water and/or marine life to a predetermined area. The system further includes at least one, and preferably a plurality of elongate buoyancy members, preferably having a tubular shape, that are attached to the flexible wall to float in a substantially upright position. Anchors are attached to each of the elongate buoyancy members to hold the elongate buoyancy members at a fixed location in the open body of water such that the flexible wall is held in a taut condition in a predetermined configuration.

In accordance with another aspect of the present invention, auxiliary floats are attached to the anchor lines between each anchor and each elongate buoyancy member to provide an upward force to the anchor lines to urge the elongate buoyancy member laterally outward from the flexible wall to maintain the flexible wall in a taut condition.

In accordance with another aspect of the present invention, the elongate buoyancy members are further attached to each other such that, upon removal of the flexible wall, the elongate buoyancy members will maintain their positions in the predetermined configuration.

In accordance with yet another aspect of the present invention, the elongate buoyancy members are displaced from the upright position at a predetermined angle. This predetermined angle is in the range of 5° to 25° fro the vertical, and preferably is 15° from the vertical.

In accordance with still yet another aspect of the present invention, the flexible wall may comprise either a net having a mesh of a predetermined size, a fabric cloth, or a combination of these different materials that permits a limited flowthrough of liquid.

*As will be readily appreciated from the foregoing description, the spar buoy pen system makes it possible to use a net pen aquaculture system in open and unprotected waters. The spar buoy as a floating vertical column has a draft much greater than its beam or depth. As a result of its shape and small waterplane area, the spar buoy is "transparent" to prevailing wave spectra, thus minimizing wave-induced motions. In addition, the compressive strength of the spars fixes the depth of the net pen to a predetermined value, which is independent of prevailing current strength. Finally, because of their stability and compressive strength, the spar buoys can be used to house auxiliary equipment, or extensions can be added above the buoys for bird nets, etc. The system is easily constructed, maintained, and relocated, plus it easily accommodates pens of a variety of shapes.*

[As will be readily appreciated from the foregoing description, the spar buoy pen system makes it possible to use a net pen aquaculture system in open and unprotected waters. The spar buoy as a floating vertical column has a draft much greater than its beam or depth. As a result of its shape and small waterplane area, the spar buoy is "transparent" to prevailing wave spectra, thus minimizing wave-induced motions. In addition, the compressive strength of the spars fixed the depth of the net pen to a predetermined value, which is independent]

*DESCRIPTION OF THE PREFERRED EMBODIMENT*

Figure 1:
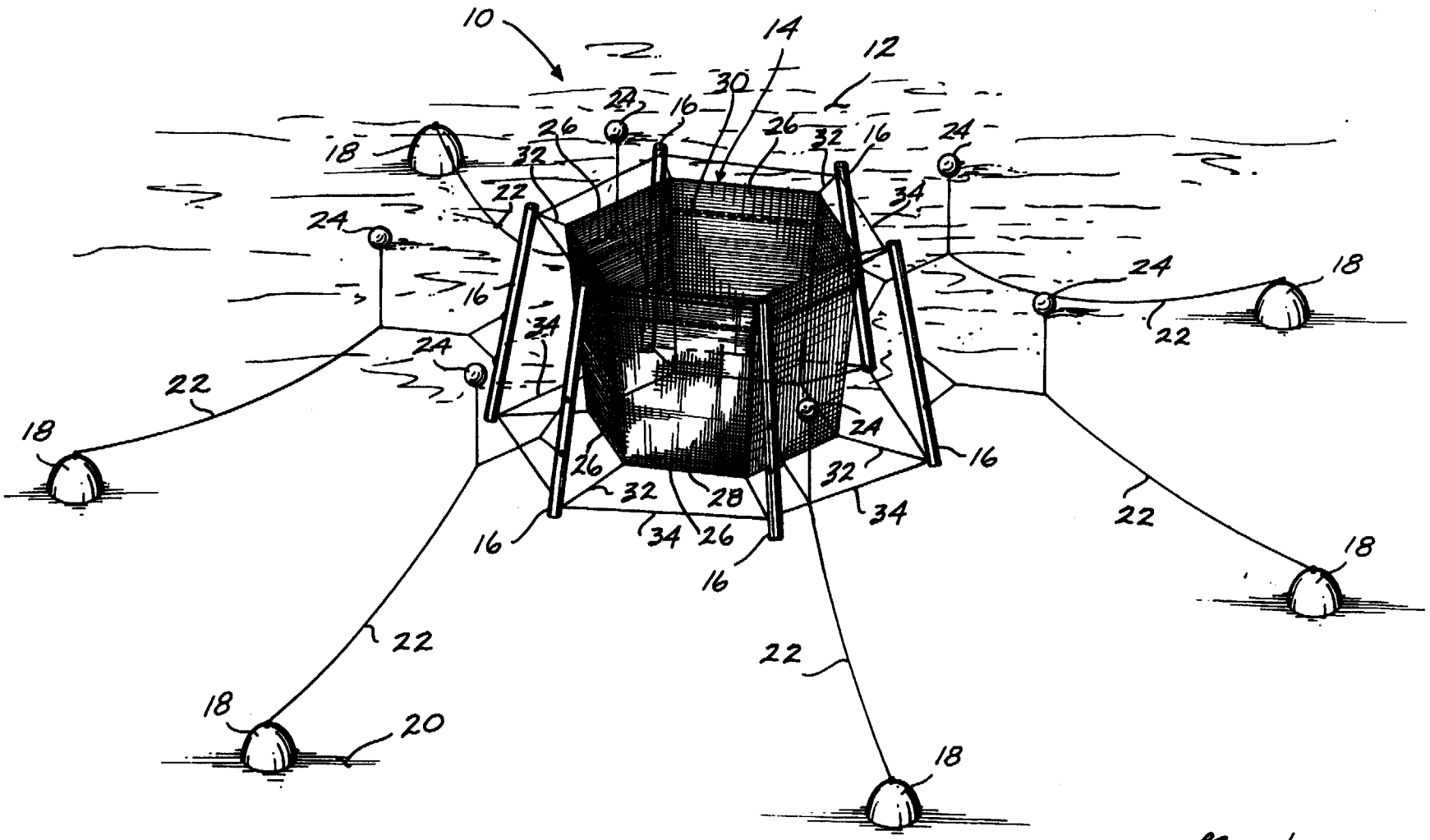
FIG. 1 is an isometric view of a spar buoy pen formed in accordance with the present invention.

*FIG. 1 illustrates a representative embodiment of the spar buoy pen system 10 situated in a body of water 12. The*

*spar buoy pen system 10 includes a net pen 14, a plurality of elongate buoyancy members, in this case spar buoys 16 attached to the net pen 14, and anchors 18 resting on the sea floor 20. Each spar buoy 16 has an anchor 18 attached to it with an anchor line 22. An auxiliary float 24 is attached to each anchor line 22.*

*The net pen 14 is formed from six generally vertically oriented flexible walls 26 and an attached flexible bottom 28. The flexible walls 26 and bottom 28 are constructed of netting material having a mesh size selected to restrict desired marine life or marine organisms within the net pen 14. Because fish tend to swim together in large groups, the wall 26 taper inward at the bottom 28 to eliminate dead space and make efficient use of the volume within the net pen 14. The net pen 14 has no rigid structure in itself, relying on the attached spar buoys 16 and anchors 18 to maintain the hexagonal configuration in a taut condition. Although the representative embodiment illustrates the net pen 14 being formed of netting, a fabric-like nylon or canvas could be used if desired.*

*The spar buoys 16 are elongate tubular columns that may be formed from stell pipe or plastic. The top and bottom are capped to provide a totally enclosed watertight chamber within each buoy 16, creating buoyancy. Flotation device may be used with the buoys 16 to provide additional buoyancy. In addition, ballasts in the form of some type of weight must be added near the bottom* of each spar buoy 16. In order for the invention to properly function, it is critical that the center of buoyancy be above the center of gravity in each spar buoy 16 so that the buoy 16 will float in a substantially upright position. The mount of flotation and ballast used on each buoy will vary, depending on whether the buoy is to be used fully submerged or whether a portion of the buoy is to remain above the waterline. In the representative embodiment illustrated in FIG. 1, the waterline 30 is denoted by a darkened ring around the net pen 14.

Each spar buoy 16 is attached to the net pen 14 with an attachment line 32 at the top and bottom of the buoy 16. In addition, connecting lines 34 attach the spar buoys 16 to each other at their tops and bottoms. While not critical to practicing the present invention, these connecting lines 34 will maintain the spar buoy 16 in their predetermined configuration, in this ease, the hexagonal shape, even when the net pen 14 is removed. This is to facilitate removal and replacement of the net pen 14 in the open water without having to remove or replace the spar buoys 16.

Each spar buoy 16 is anchored at a predetermined location to the sea floor 20 by an anchor 18. The anchor may be any suitable weighted article that will remain stationary when placed on the sea floor 20. The anchor lines 22 are shown attached to each buoy 16 at one or more points, and preferably at two locations to stabilize the buoy 16 in the water. To avoid a downward pull on the buoys from the anchor lines 22, an auxiliary float 24 is attached to each anchor line 22 to provide an upward force on the anchor line 22. This results in the anchor line 22 exerting a lateral force on each buoy 16 to urge each spar buoy 16 laterally outwardly from the net pen 14 to thereby maintain the net pen 14 in a taut, or stretched, open state.

Although the spar buoy 16 may be used in a substantially upright position, this may be too flexible in some systems. It has been found that if the spar buoys are deflected from the vertical, they will reach a point where they are resistant to further deflection because of increased righting moment. Depending on the configuration of the particular spar buoy, this angle has been found to be in the range of 5° to 25°, and, in the representative embodiment shown in FIG. 1, is preferably 15°. Consequently, the anchors 18 and the deflected spar buoys 16 cooperate to hold the net pen 14 in the hexagonal configuration and in a taut condition. To assist in maintaining the spar buoys 16 at an angle, the attachment lines 32 at the top of each buoy 16 are shorter than the attachment lines 32 at the bottom of each buoy 16, and the anchor lines 22 are attached preferably below the midpoint of each spar buoy 16.

Figure 2:
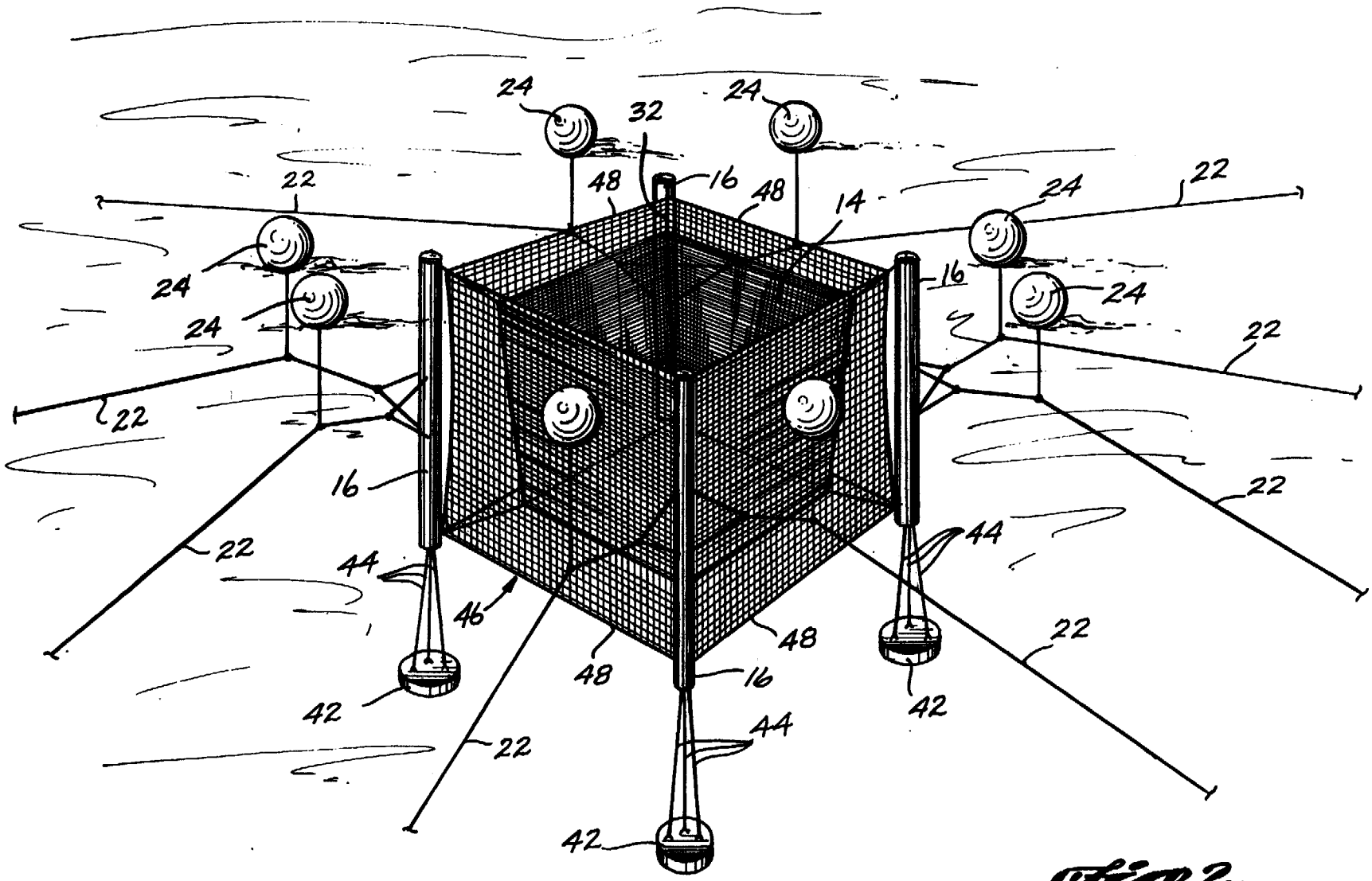
FIG. 2 is an isometric view showing an alternative embodiment of the spar buoy pen system including a predator net and damper plates attached to the spar buoys.

An alternative spar pen system 40 of this invention is described with respect to FIG. 2. The spar pen system 40 includes the same basic net pen 14, spar buoys 16, anchors 18 and float 24 included in the previous embodiment of the invention. Attached to the bottom of each spar buoy 16 is a damper plate 42. The damper plates 42 are attached to the associated spar buoys 16 by a set of lines 44 (three shown) so that the damper plates are suspended in substantially horizontal orientation. The damper plates 42, which reduce the vertical motion of the spar buoys 16, have a mass and a diameter which are a function of the extent to which they are required to reduce vertical motion and the size of the associated spar buoys 16. The damper plates 42 typically range in diameter from 4 to 12 feet and in mass from 200 to 10,000 pounds. The lines 44 are designed to suspend the damper plates 42 anywhere from 3 to 16 feet below the associated spar buoys 16. For example, a spar pen system provided with 40-foot spar buoys 16 may be provided with damper plates 42 that are approximately 6 to 7 feet across, weigh approximately 4,000 pounds, and that are suspended approximately 12 feet below the associated spar buoys.

Spar buoy pen 40 is also provided with a predator net 46 that is suspended between the spar buoys 16. In the illustrated embodiment, the predator net 46 is shown as being formed out of individual sections 48 of netting that are separately attached to the adjacent spar buoys 16. In an alternative embodiment, the net may be formed out of a single section of netting. In still other embodiments of the invention, the connecting lines 34 lines may be integral part of the predator net 46.

Another feature of this invention illustrated in FIG. 2 is the use of multiple anchor assemblies for securing the individual spar buoys 16 to the sea bed. This embodiment of the invention may be practiced when it is desired to place the system 40 in rough waters.

The damper plates 42 of spar buoy pen system 40 reduce the wave-induced vertical movement of the associated spar buoys 16 and the entire pen system. This serves to both reduce the danger and lessen the difficulty of operating a vessel in the vicinity of the pen during tending operations. Another advantage of reducing the vertical motion of the pen system is that it reduces the resulting stress and strain levels to which the connecting components of the system 40 are exposed so as to increase their useful lifetime.

Still another advantage of this embodiment of the system is that the damper plates 42 can be selected so that the spar buoys 16 and net pen 14 will follow the oscillations of long period underlying waves, called swells, that are present in most sea states. Tender vessels typically oscillate with the swells. Consequentially, in these embodiments of the invention the motion of the buoys and the pen will be tuned to the motion of the sea and the tender so as to further lessen the difficulty and danger of tending the contents of the net pen 14. Thus, while the damper plates 42 allow the system 40 to move with the sea and tender vessels, they limit the movement of the system in response to short period waves, called chop, which induce hazardous short period oscillations. Another advantage of selecting the damper plates to allow limited vertical motion of the buoys 16 and the net pen 14, is that it reduces the chances that a sea swell can crest over the pen 14 which could cause some of the fish therein to be washed out and/or offer the more active fish an opportunity to swim out over the top of the pen.

The predator net 46 limits the extent to which marine life not contained within the system can attack or approach the fish contained within the net pen 14. For example, the predator net prevents marine mammals or other predators from bumping or attacking the net pen 14 which can, over time, cause a hole to develop in the net pen which would have obviously undesirable results. Moreover, by preventing predators from bumping the net pen 14, the predator net 46 prevents the marine life in the net pen from being forced out of the net pen by the bumping action. The predator net 46 also functions as a barrier to prevent floating debris from damaging the net pen 14.

Figure 3:
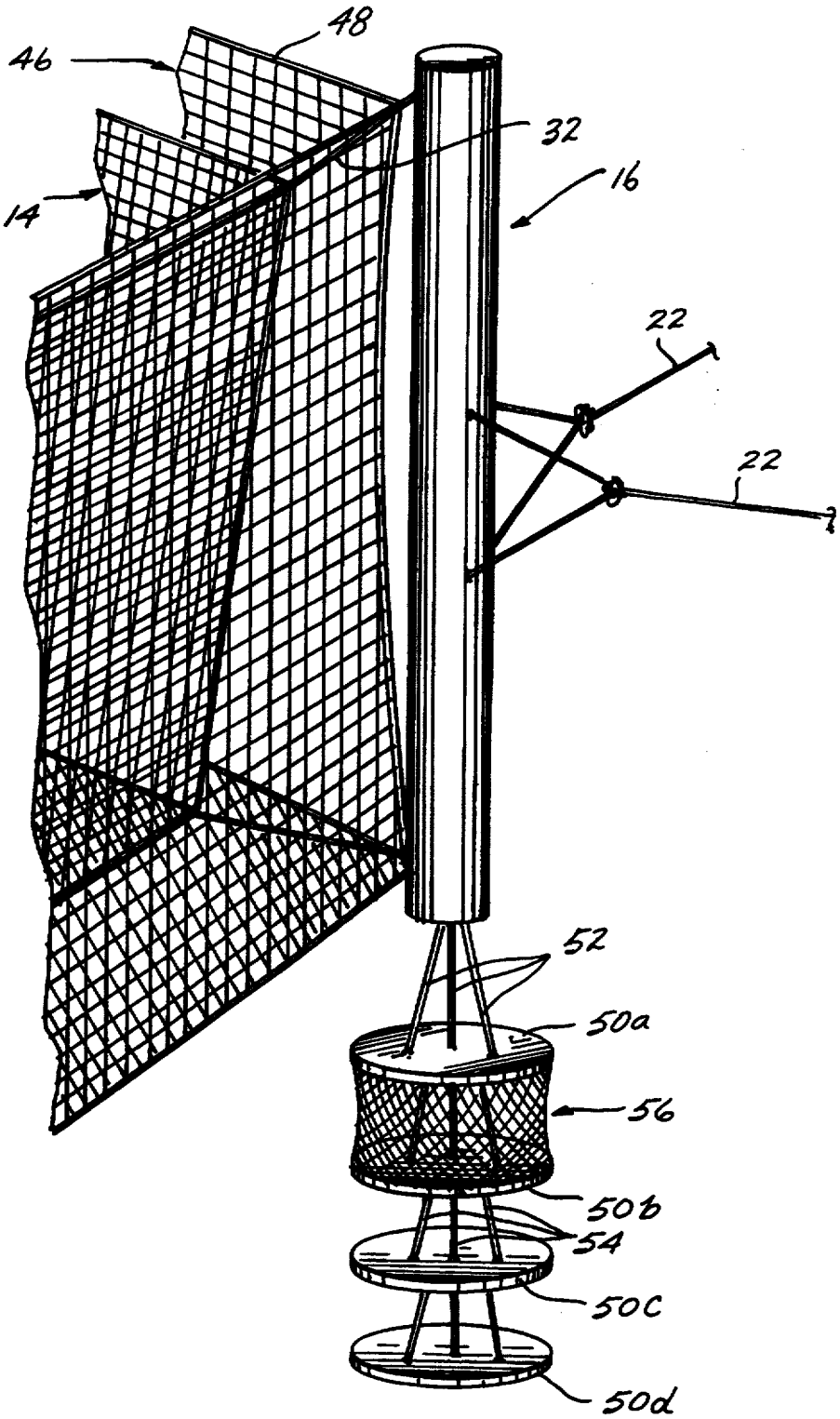
FIG. 3 is a view of an alternative stacked damper plate arrangement for use with the present invention.

As illustrated in FIG. 3 a spar buoy 16 may alternatively be provided with a set of stacked damper plates 50a, b, c and d. The top most damper plate, damper plate 50a, is secured directly to the base of the spar buoy 16 by a set of attachment lines 52. The remaining spar damper plates 50b, c, and d are stacked underneath damper plate 50a and is attached to the overlying damper plate by a set of attachment lines 54. A net 56 is shown as being suspended between damper plates 50a and 50b.

An advantage of providing a set of stacked damper plates 50a, b, c and d is that the individual plates multiply the overall damping effect. Consequently, several small stacked damper plates 50a, b, c and d can be used to reduce wave-induced net motion in circumstances where it is either undesirable or impractical to use a single, large diameter plate. Still another advantage of providing a set of stacked damper plates and the net 56 between adjacent plates is that it would be possible to grow shellfish on the plates. The net 56 can, of course also be used to hold additional fish, such as fish that serve as food for the fish in the net pen 14.

It is to be appreciated that, while representative embodiments of the invention have been shown and described, various changes may be made therein without departing from the spirit and scope of the invention. For instance, the net pen 14 may have a square, triangular or octagonal shape. Furthermore, the net pen 14 may be replaced with a single flexible wall formed of either netting, fabric, or canvas. In addition, the spar buoy 16 may be used to hold platforms, feeding systems. or storage containers. Similarly, masts, bird nets and other devices may be attached to the top of each of the buoys 16. Moreover, in some embodiments of the invention, the damper plates 42 or 50a, b, c and d may be attached to the associated spar buoys 16 by rigid connectors rather than the flexible attachment lines as is illustrated. For example, it may be desirable to affix either a single damper plate 42 or a set of stacked damper plates 50a, b, c and d to the spar buoy by a rigid metal rod. Alternatively it may be desirable to form the spar buoy 16 so that clamper plate is an integral part thereof. In these embodiments of the invention, the damper plate, or a set of damper plates, may be built into the individual spar buoys so as to serve as their base sections.

It should further be understood that the disclosed range of dimensions and weights for the elements of this invention are merely illustrative and not limiting. For example, it is foreseeable in versions of this invention wherein the system is used to stabilize either surface or submerged living or working facilities, the spar buoys 16 can be 300 feet long and 30 feet in diameter. Such versions of the invention can be provided with the appropriately dimensioned damper plates 42. Moreover, it is clear that the spar buoy pen systems of this invention can be provided with the damper plates 42 and predator net 46 either together or separately as may be required by the specific construction of this system. Furthermore, it should also be understood that the predator net 46 can be used in embodiments of this invention where attachment lines 32 of unequal length are connected between the net pen 14 and the spar buoys 16 in order to provide the buoys with a righting moment.

As will be readily appreciated from the foregoing, the design illustrated herein incorporates the use of spar buoys to shape and anchor net pens used to grow fish for marketing, research or recreation. With the spar buoy anchored to the bottom of the body of water and the net pen attached to the spar buoy at the top and bottom, or along its entire draft, the spar buoy fixes the maximum designed depth of the net pen vertically by virtue of its vertical stability. The direction and magnitude of the anchoring forces acting through the spar buoy and the net fix the final net pen configuration in length, width, and depth, and maintain the net pen in a taut condition. The spar buoy net pen system can be used in any configuration, with as few as three buoys for a triangular pen, or more buoys arranged in a line may be used to form a wall, depending upon the final net pen configuration. A wall of netting of fabric can also be used as a current "blocker" to reduce current and forces on a downstream pen or object in its "shadow". This use can be independent of raising fish. In this system, the anchors 18, the spar buoy 16, and the net pen 14 all form a flexible structure that can be used to hold a variety of marine species for aquacultural, recreational or research purposes. Furthermore, the spar buoys make it possible to use a more solid, flexible wall such as fabric or canvas because it will not be affected by [current] *currents* or waves. The spar buoy net pens may also be arranged in systems of nets that use one or more spar buoys in common.

The embodiments of the invention in which an exclusive property or privilege is claimed are defined as follows:

1. A spar buoy pen comprising:

a flexible net forming an enclosed pen;

at least three elongated spar buoys adapted to float substantially vertically whereby each said spar buoy is attached to said net at at least two vertically spaced-apart locations so as to maintain a portion of said net adjacent said spar buoy in a substantially vertical orientation, and whereby said spar buoys are attached to said net at locations spaced apart from each other so that each said spar buoy can float freely relative to said spar buoys adjacent thereto;

separate anchor means attached to each of said spar buoys, each said anchor means adapted to urge said spar buoy associated therewith outwards from said net so that said spar buoys are urged away from each other so as to maintain said pen in an open state; and at least two vertically spaced-apart, generally parallel lines extending between adjacent ones of said spar buoys so as to maintain said spar buoys in a predetermined configuration upon removal of said net.

2. The spar buoy pen of claim 1, wherein at least one of said anchor means includes an anchor attached to said associated spar buoy by an anchor line and a float attached to said anchor line by a supplemental line connected between said anchor and said spar buoy to urge said spar buoy away from said net.

3. The spar buoy pen of claim 1, wherein at least one said spar buoy is connected to said net by a first upper attachment line and a second upper attachment line, said first attachment line being shorter than sraid second attachment line so that said spar buoy is displaced from a vertical position at a predetermined angle.

4. The spar buoy pen of claim 3, wherein said predetermined angle is in the range of 5° to 25° from the vertical towards said net.

5. The spar buoy pen of claim 3, wherein said predetermined angle is approximately 15° from the vertical towards said net.

6. The spar buoy pen of claim 1, wherein: said net is [diminished] *dimensioned* so that said pen is located within a perimeter of an area defined by said spar buoys;

at least two vertically spaced-apart attachment lines are connected between each of said spar buoys and said net; and a predator net is suspended from each of said spar buoys so as to surround said pen wherein said predator net includes said at least two vertically spaced-apart generally parallel lines for maintaining said spar buoys in said predetermined configuration.

7. The spar buoy pen of claim 6, wherein said predator net is formed from a plurality of separate sections.

8. The spar buoy of claim 7, wherein each predator net section is suspended between said adjacent spar buoys.

9. The spar buoy *pen* of claim 1, further including at least one damper plate suspended below at least one of said spar buoys.

10. The spar buoy pen of claim 1, further including a plurality of damper plates suspended below at least one of said spar buoys.

11. The spar buoy pen of claim 10, further including a net extending between at least two of said damper plates.

12. A spar buoy pen comprising:

a flexible net forming an enclosed pen;

at least three elongated spar buoys adapted to float substantially vertically attached to said net pen at horizontally spaced-apart locations so as to suspend said net above a sea bed whereby at least one of said spar buoys is connected to said net pen by a first upper attachment line and a second [upper] *lower* attachment line, wherein said first attachment line is shorter than said second attachment line so that said spar buoy is displaced from the vertical position at a predetermined angle;

a predator net suspended from said spar buoys so as to surround said pen; and separate anchor means attached to each of said spar buoys, wherein each said anchor means is adapted to urge said spar buoy associated therewith outward so as to maintain both said predator net and said pen in an open state.

13. The spar buoy pen of claim 12, wherein said predetermined angle [if] *is* in the range from 5 to 25 degrees from the vertical toward said net pen.

14. The spar buoy pen of claim 12, wherein at least one spar buoy is further provided with a damper plate suspended a distance below said spar buoy.

15. The spar buoy pen of claim 12, further including a plurality of damper plates suspended below at least one of said spar buoys.

16. The spar buoy pen of claim 15 further including a net extending between at least two of said damper plates.

*17. A non-rigid structural-frame-free spar buoy pen comprising:*

*a flexible net forming an enclosed pen;*

*at least three elongated spar buoys adapted to float substantially vertically, each said spar buoy being attached to said net at at least two vertically spaced-apart locations so that said flexible net is held open vertically, and said spar buoys being attached to said net at locations horizontally spaced-apart from each other, wherein said spar buoy pen does not include a rigid structural frame so that each said spar buoy can float freely relative to said spar buoys adjacent thereto; and*

*separate anchor means attached to each of said spar buoys, each said anchor means adapted to urge said spar buoy associated therewith outwards from said net so that said spar buoys are urged away from each other so that said flexible net is held open horizontally without a rigid structural frame.*

*18. The spar buoy pen of claim 17, wherein each said spar buoy is attached to said net by a first upper attachment line and a second lower attachment line, said first upper attachment line being shorter than said second lower attachment line so that each said spar buoy is displaced from the vertical position at a predetermined angle.*

*19. The spar buoy pen of claim 18, wherein said predetermined angle is in the range of 5 to 25 degrees from the vertical towards said net.*

*20. The spar buoy pen of claim 18, wherein each said spar buoy is linked to an adjacent spar buoy by at least one line so as to maintain said spar buoys in a predetermined configuration upon removal of said net.*

*21. The spar buoy pen of claim 18, wherein adjacent ones of said spar buoys are interconnected with at least two vertically spaced-apart, generally parallel lines so as to maintain said spar buoys in a predetermined configuration upon removal of said net.*

*22. The spar buoy pen of claim 21, wherein said anchor means includes an anchor attached to said associated spar buoy by an anchor line and an auxiliary float attached to said anchor line so as to urge said associated spar buoy away from said net.*

*23. The spar buoy pen of claim 18, wherein said anchor means includes an anchor attached to said associated spar buoy by an anchor line and an auxiliary float attached to said anchor line so as to urge said associated spar buoy away from said net.*

*24. The spar buoy pen of claim 17, wherein each said spar buoy is linked to an adjacent spar buoy by at least one line so as to maintain said spar buoys in a predetermined configuration upon removal of said net.*

*25. The spar buoy pen of claim 24, wherein said anchor means includes an anchor attached to said associated spar buoy by an anchor line and an auxiliary float attached to said anchor line so as to urge said associated spar buoy away from said net.*

*26. The spar buoy pen of claim 17, wherein adjacent ones of said spar buoys are interconnected with at least two vertically spaced-apart, generally parallel lines so as to maintain said spar buoys in a predetermined configuration upon removal of said net.*

*27. The spar buoy pen of claim 17, wherein said anchor means includes an anchor attached to said associated spar buoy by an anchor line and an auxiliary float attached to said anchor line so as to urge said associated spar buoy away from said net.*

* * * * *

UNITED STATES PATENT AND TRADEMARK OFFICE

CERTIFICATE OF CORRECTION

PATENT NO. : Re. 34,971

DATED : June 20, 1995

INVENTOR(S) : G.F. Loverich et al.

It is certified that error appears in the above-indentified patent and that said Letters Patent is hereby corrected as shown below:

| COLUMN | LINE | |
|---|---|---|
| [56] (pg. 1, col. 2) | Refs. Cited For. Pat Docs | Insert --2562388 10/1985 France-- |

Signed and Sealed this

Sixteenth Day of January, 1996

*Attest:*

*Attesting Officer*

BRUCE LEHMAN

*Commissioner of Patents and Trademarks*